Feb. 5, 1957 F. R. HELLMANN, JR 2,780,359
FILTER APPARATUS
Filed June 26, 1953

INVENTOR.
FRANK R. HELLMAN, JR.
BY
Oberlin & Limbach
ATTORNEYS.

2,780,359
FILTER APPARATUS

Frank R. Hellmann, Jr., Lima, Ohio, assignor to The Standard Oil Company, Cleveland, Ohio, a corporation of Ohio Application June 26, 1953, Serial No. 364,233

2 Claims. (Cl. 210—43)

In most filtering apparatus of stationary character there is a problem of how to dispose of solids without undue disturbance of filtering screen elements. Ordinarily, various removal means are provided for such elements in order to permit access or exit for the solids. And, in some kinds of operation where a liquid is passed through a bed of granular material, the matter of interference with screen elements is particularly complicated. In accordance with the present invention however, it now becomes possible to provide filtration or percolation apparatus such that screen elements while being in the path of flow exit of liquid, are yet wholly out of the way of exit of solids when these are to be removed. Other objects and advantages of the invention will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
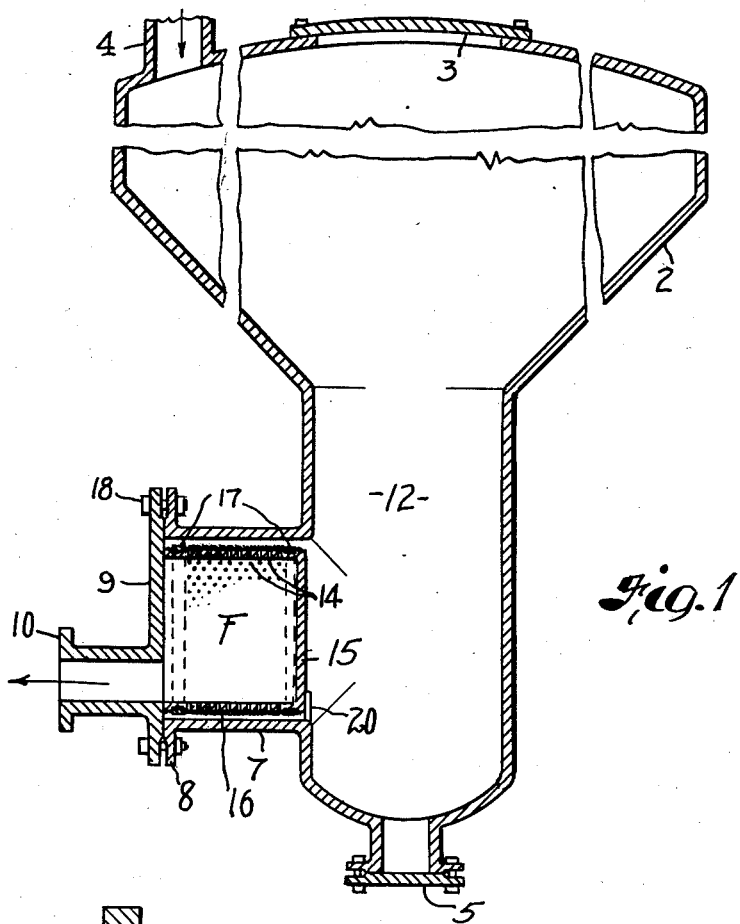
Figure 2:
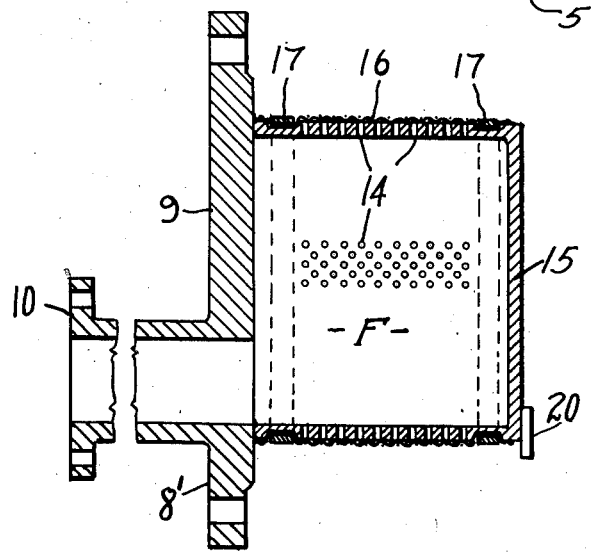

In said annexed drawing:

Fig. 1 is a sectional view, parts being broken out on account of space limitation, showing an embodiment of the invention; and Fig. 2 is a sectional detail on enlarged scale, again parts being broken out on account of space limitation.

In general, the invention involves a container which has at its lower end an outlet which normally is closed, while at a point thereabove in the lateral wall there is a filter element in a recess wholly out of the way of the adjacent container portion, and the filter element in the path of liquid flow has its outlet externally.

As seen by reference to Fig. 1 of the drawing, a container or tank 2, having for instance at its top a removable closure 3 for admission of granular filtering material if desired, and a pipe inlet 4 for liquid, has a bottom outlet normally closed by a head 5, for instance bolted on. At a point above the outlet there is a recess, shown as a lateral branch 7, which may be flanged as at 8, to receive a mating flange of head 9, and this is provided with a fluid outlet which may be flanged as at 10 for connection to piping. The head 9 retains a filter element F in the recess, and while in some cases this may be separable from the head, it is usually preferable that it be secured to the head 9 so as to be removable therewith. As seen from this general arrangement, the filter element is in the line of flow of liquid, but out of the line of interference with what may be in the portion 12 of the container adjacent.

The filter element is in general hollow and box-like, preferably a hollow cylinder, and its periphery is provided with multitudinous perforations 14. The inner end 15 may be perforated, but preferably is generally of closed form. While the perforated wall of the filter element may in many cases be depended upon to provide the filtering boundary, usually it is preferable to also have a screen cover thereover, and this may be a cylinder of screen 16, held in place by clamping bands 17. By such arrangement, the screen can be easily replaced or repaired when need arises. Since the preferred construction involves an attached cylinder carried by the head 9, it is seen that by removing the fastening means holding the head, for instance bolts 18, the head may be taken off, carrying with it the filter as a cartridge. By relatively dimensioning the latter such that it is spaced within the recess or branch 7, ample access of the fluid to and through the filter unit is provided. If desired, strengthening and supporting means such as three equi-spaced legs 20 may be welded to the back, and assure equal spacing and support of the filter cartridge within the recess.

As an example: Liquid containing solid suspended matter which it is desired to separate, is flowed into the top of the container, and passing through the filter cartridge proceeds out, separated, through the filter outlet, while solids settle down into the sump portion 12. The sump can be cleaned out, on shutting off the access of liquid, and draining what is available through the liquid outlet, and then removing the bottom head 5.

As another example: The tank is filled to a desired height with granular filter material, e. g., filter clay, and an oil which is to be clarified is supplied through the liquid inlet at the top, and passing through the filter cartridge proceeds as clarified product from its outlet. When the filter clay is spent or loaded up by shutting off the oil supply, draining, and finally opening the bottom head, the spent granular filter material is discharged.

Other modes of applying the principle of the invention may be employed, change being made as regards the details described, provided the features stated in any of the following claims or the equivalent of such be employed.

I therefore particularly point out and distinctly claim as my invention:

1. In filtering apparatus of the character described, a container having an inlet connection at its top for the supply of liquid thereto and a separate port also at the top for the introduction of solid material, an outlet for the liquid in the form of a hollow cylinder opening in the side wall of said container and extending laterally outwardly therefrom, such opening of the cylinder being spaced appreciably from the bottom of the container, a tubular filter supported in spaced relation within said cylinder, said filter having a perforated side wall and being closed at its inner end by an imperforate wall which is substantially coextensive with the container side wall at the cylinder opening in the same, a closure at the outer end of said cylinder which is removable for withdrawal of the filter from the cylinder through such end, and a normally closed outlet at the bottom of the container for the removal of solids therefrom.

2. Filtering apparatus as set forth in claim 1 characterized further in that the tubular filter is attached at its outer end to said closure for the cylinder and is provided at its inner end with a plurality of spaced apart legs serving to support such inner end in proper spaced relation to the cylinder.

References Cited in the file of this patent

UNITED STATES PATENTS

| 1,001,929 | Collins | Aug. 29, 1911 |
| 1,071,306 | Finigan | Aug. 26, 1913 |
| 1,175,948 | French | Mar. 21, 1916 |
| 2,159,558 | Kishline et al. | May 23, 1939 |
| 2,346,682 | Harris | Apr. 18, 1944 |
| 2,575,542 | Wubbe | Nov. 20, 1951 |
| 2,580,012 | Gazda | Dec. 25, 1951 |